United States Patent [19]

Peter et al.

[11] Patent Number: 5,947,219

[45] Date of Patent: Sep. 7, 1999

[54] AIR FLOW STRUCTURE FOR USE WITH AN ASSOCIATED ENGINE

[75] Inventors: Timothy Jon Peter; Kenneth Ray Smith, both of Medina, Ohio

[73] Assignee: MTD Products Inc., Cleveland, Ohio

[21] Appl. No.: 08/783,882

[22] Filed: Jan. 16, 1997

[51] Int. Cl.$^6$ ........................................... B60K 11/08
[52] U.S. Cl. ........................................ 180/68.1; 180/68.3
[58] Field of Search .................................. 180/68.1, 68.3, 180/68.4, 68.6, 69.2, 69.25; 293/115

[56] References Cited

U.S. PATENT DOCUMENTS

| | | | |
|---|---|---|---|
| 216,877 | 3/1970 | Gale et al. | D14/18 |
| 271,020 | 10/1983 | Maimberg et al. | D15/15 |
| 284,968 | 8/1986 | Watanabe et al. | D15/15 |
| 293,683 | 1/1988 | Mizushima et al. | D15/15 |
| 365,349 | 12/1995 | Katoh et al. | D15/15 |
| 1,183,670 | 5/1916 | Riker . | |
| 2,050,451 | 8/1936 | Nallinger | 180/68.1 |
| 2,064,380 | 12/1936 | Ledwinka | 180/68.1 |
| 2,143,889 | 1/1939 | Ledwinka | 180/54 |
| 2,194,396 | 3/1940 | Klavik | 180/54 |
| 2,199,316 | 4/1940 | Klavik | 180/54 |
| 2,235,496 | 3/1941 | Greig | 180/69 |
| 2,556,464 | 6/1951 | Brezek | 180/68.1 |
| 3,152,240 | 10/1964 | Chew | 180/69 |
| 3,481,117 | 12/1969 | McKinlay | 55/385 |
| 3,572,813 | 3/1971 | Takada | 296/28 |
| 3,796,277 | 3/1974 | Gordon | 180/54 |
| 4,437,529 | 3/1984 | Fralish | 180/69.2 |
| 4,566,407 | 1/1986 | Peter | 180/68.4 |
| 4,573,544 | 3/1986 | Hoch et al. | 180/68.1 |
| 4,606,422 | 8/1986 | Jewett | 180/68.3 |
| 4,723,594 | 2/1988 | Koehr et al. | 180/68.4 |
| 4,778,029 | 10/1988 | Thornburgh | 180/68.3 |
| 4,940,100 | 7/1990 | Ueda | 180/68.1 |
| 4,991,675 | 2/1991 | Tosconi et al. | 180/69.21 |
| 5,022,479 | 6/1991 | Kiser et al. | 180/69.25 |
| 5,046,550 | 9/1991 | Boll et al. | 180/68.4 |
| 5,193,636 | 3/1993 | Holm | 180/68.1 |
| 5,199,521 | 4/1993 | Samejima et al. | 180/68.1 |
| 5,284,115 | 2/1994 | Imanishi et al. | 180/68.1 |
| 5,564,513 | 10/1996 | Wible et al. | 180/68.3 |

FOREIGN PATENT DOCUMENTS

| | | | |
|---|---|---|---|
| 844862 | 8/1960 | United Kingdom | 180/68.3 |
| 2059890 | 4/1981 | United Kingdom | 180/68.3 |

*Primary Examiner*—J. J. Swann
*Assistant Examiner*—Frank Vanaman
*Attorney, Agent, or Firm*—Emerson & Associates; Roger D. Emerson; Timothy D. Bennett

[57] ABSTRACT

An air flow structure for use in providing air to an engine mounted on an associated vehicle includes a hood for covering the engine, an air grill and connecting means for connecting the air grill to the hood. The air grill has a contoured cap, air inlet openings around the circumference and a discharge opening. The inlet openings are angled and are covered by the cap so that it is relatively difficult for rain or other unwanted substances to enter the engine.

11 Claims, 5 Drawing Sheets

AIR FLOW STRUCTURE FOR USE WITH AN ASSOCIATED ENGINE

BACKGROUND OF THE INVENTION

1. Field of Invention

This invention pertains to the art of methods and apparatuses for providing cooling air and combustion air to an engine.

2. Description of the Related Art

Many types of engines require air for cooling. Air cooled engines need air to flow directly over them. As the air contacts the engine, it removes heat from the engine through heat transfer. Liquid cooled engines also require air for cooling. Typically they use a liquid that is circulated to the engine, where heat is transferred to the liquid, and then to a radiator where the heat is transferred to air. Internal combustion engines not only require air for cooling, but also for the combustion process.

A common problem encountered in the art deals with providing clean, cool air to engines. This is especially true for engines that cannot practically take advantage of long air duct passages as in the case of engines mounted on vehicles.

The present invention provides an improved air flow structure. Thus, the problem described above is overcome in a way which is simple and efficient, while providing better and more advantageous results.

SUMMARY OF THE INVENTION

In accordance with one aspect of the invention there is provided an air flow structure for use in providing air to an engine mounted on an associated vehicle. The flow structure includes a hood for covering the engine, an air grill having air inlet means and connecting means for connecting the air grill to the hood.

In accordance with another aspect of the invention the air grill has a contoured cap, air inlet openings around the circumference, a discharge opening, and connecting means for connecting to the engine cover.

In accordance with another aspect of the invention, the air stream is directed first one way, then another way in a convoluted multidirectional manner so that particular matter within the air stream is caused to fall out of the air stream, thus providing a cleaner air stream to the engine and accomplishing such without the need of a conventional filter.

One advantage of the invention is that it allows air to be drawn from the top of the vehicle. Such air is relatively cool and clean.

Another advantage of the invention is that it can be used to draw air for both engine cooling and combustion purposes.

Another advantage of the invention is that it is difficult for rain or other unwanted substances to enter the engine via the airflow.

Another advantage of the invention is the convoluted and directed air stream which causes particular matter suspended in the air stream to drop out, thus filtering the air without the need of a conventional filter.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
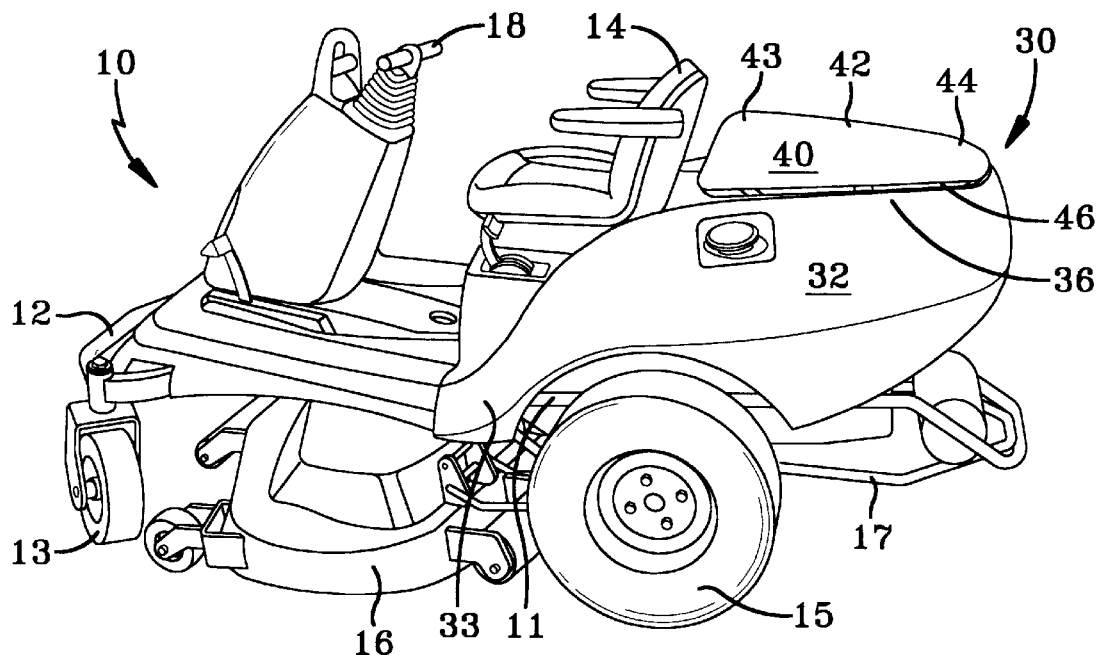
FIG. 1 shows a riding lawn mower which incorporates the air flow structure of this invention.
Figure 2:
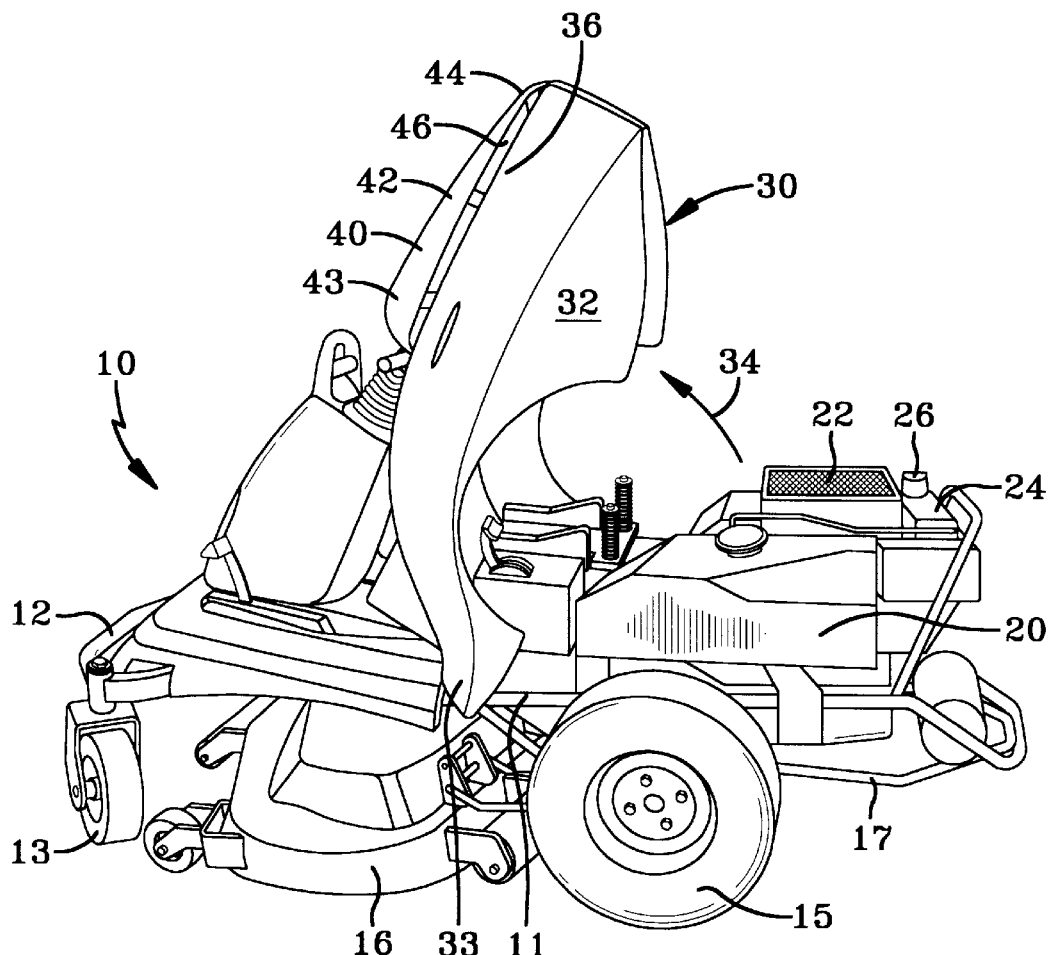
FIG. 2 shows the riding lawn mower with the hood in the open position.
Figure 3:
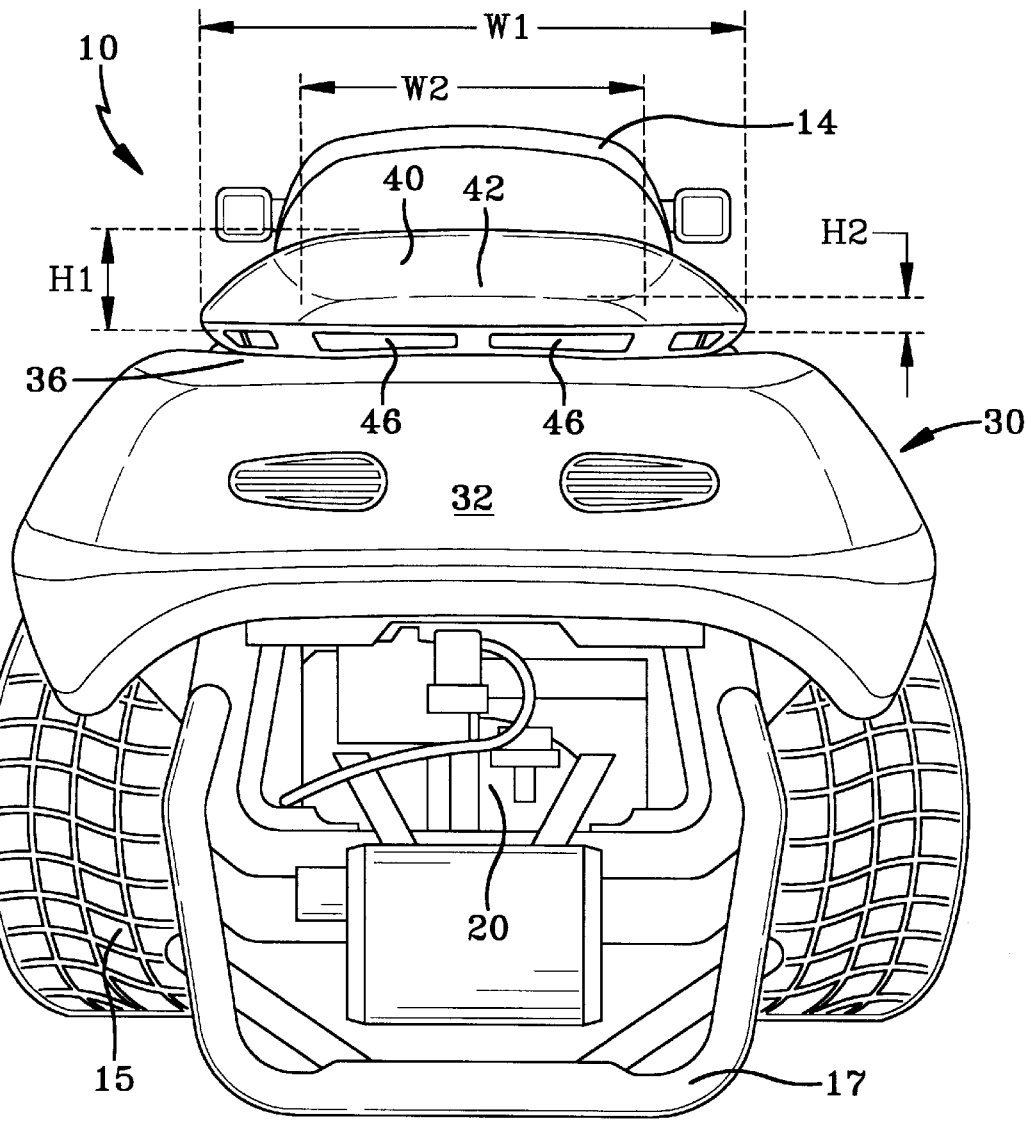
FIG. 3 shows a back view of the riding lawn mower.

Referring now to the drawings wherein the showings are for purposes of illustrating a preferred embodiment of the invention only and not for purposes of limiting the same, FIGS. 1–3 show a riding lawn mower 10 which is equipped with an air flow structure 30 according to one embodiment of the invention. This preferred embodiment is directed to a riding lawn mower but the invention is applicable to walk-behind mowers, off-the-road vehicles, and other applications as well. The riding lawn mower 10 has a frame 12 with a mid-section 11 and a back 17, front and back wheels 13, 15, an operator seat 14, a cutting deck 16, a steering mechanism 18 and an engine 20. The engine 20 can be of any type currently used in the art including either air-cooled or liquid-cooled engines. As shown in FIG. 2, in the preferred embodiment the engine 20 is an internal combustion engine mounted on the back 17 of the frame 12. The engine 20 is liquid-cooled, and includes a radiator 22 and a combustion air cleaner 24 which has an inlet opening 26. The combustion air cleaner 24 cleans the air that is drawn into the engine 20 for use in combustion.

With reference to FIGS. 1–3 and 7–8, the air flow structure 30 has a hood 32 for covering the engine 20. The hood 32 has a first end 33 and a top 36 which has an opening 35. The hood 32 is pivotably attached at its first end 33 by any means commonly known in the art to the mid-section 11 of the frame 12 such that it opens in a counter-clockwise direction 34 when viewed from the perspective shown in FIG. 2. The air flow structure 30 also has an air grill 40 mounted on the top 36 of the hood 32 such that the air grill 40 is positioned directly over opening 35 and the engine 20 when the hood 32 is in its closed position as shown in FIGS. 1 and 3. By placing the air grill 40 on the top 36 of the hood 32 relatively far from the engine 20 exhaust and from the cutting deck 16, relatively cool and clean air will be obtained.

Figure 4:
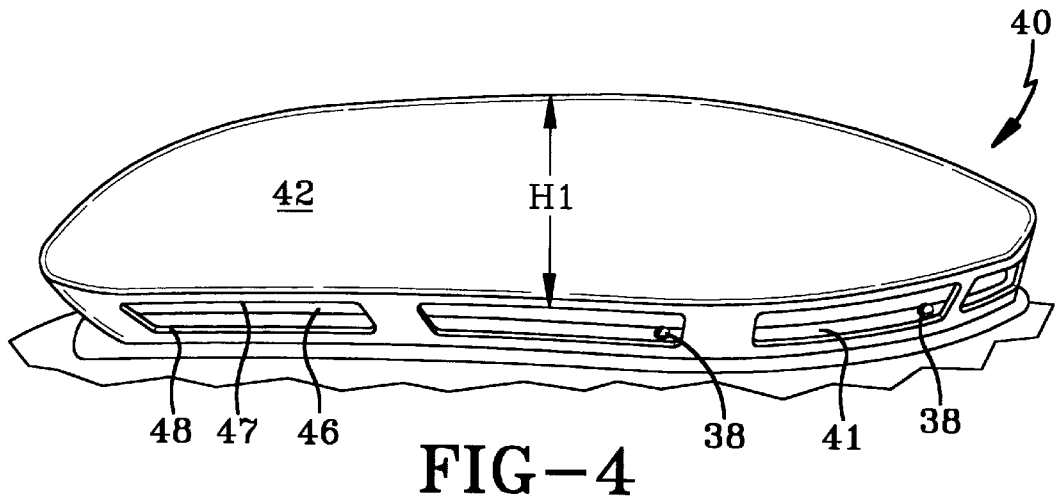
FIG. 4 shows a perspective view of the air grill from the position of the operator seat.
Figure 5:
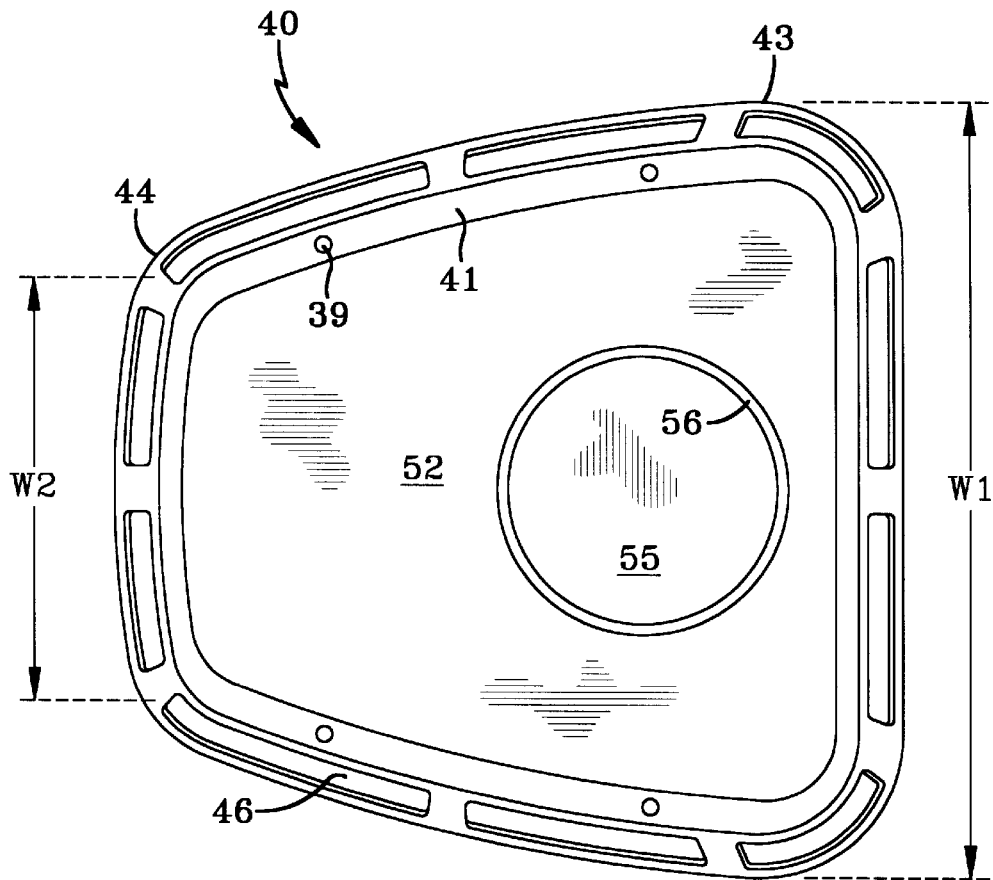
FIG. 5 is a bottom view of the air grill.
Figure 6:
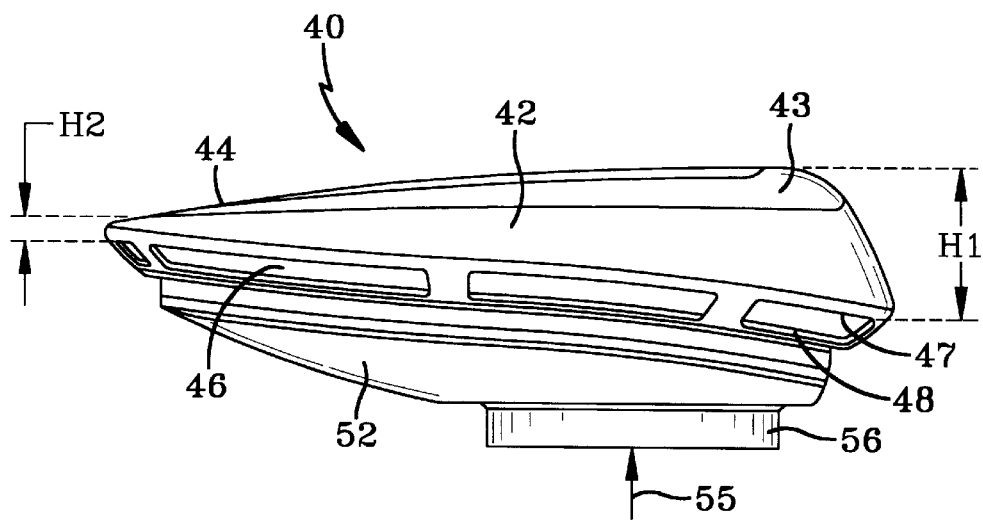
FIG. 6 is a side view of the air grill.

With reference now to FIGS. 1–6 and 9, the air grill 40 has a cap 42 which has a front 43 and a back 44. The cap 42 has a contoured shape which makes it aesthetically pleasing and assists in drawing air into the engine 20 through inlet openings 46. The rounded and contoured shape assists in drawing air into the engine 20 through the inlet openings 46 by reducing losses of momentum in the air stream. The contoured shape of the cap 42 can be observed, in part, by noting that the front 43, as seen in FIGS. 4–6, has a height H1 and a width W1 while the back 44, as seen in FIGS. 3, 5–6, has a height H2 and a width W2. The cap 42 has been designed in this preferred embodiment such that the height and width H1, W1 of the front 43 of the cap 42 is substantially larger than the height and width H2, W2 of the back 44 of the cap 42. In the preferred embodiment, height H1 is approximately equal to 4.2 inches, height H2 is approximately equal to 2.3 inches, width W1 is approximately equal to 20.6 inches, and width W2 is approximately equal to 13.7 inches. The benefits of the invention can generally be achieved if the ratio of H1/H2 is between 1.2 and 3.0 and the ratio of W1/W2 is between 1.2 and 10.0. The term "contoured" means that the cap 42 has few linear or planar surfaces; rather, the surfaces of the cap 42 are rounded, curved, and generally non-planar. Inlet openings 46, which are positioned around a middle portion, admit air into the air grill 40. The middle portion connects the cap 46 to a later to be described bottom 52. In this preferred embodiment, as best seen in FIG. 5, there are ten inlet openings but any number of openings chosen with sound engineering judgement could be used. Also preferred and shown in FIG. 5, the middle portion has four sides and at least one of the inlet openings 46 are positioned on each of the four sides.

Figure 9:
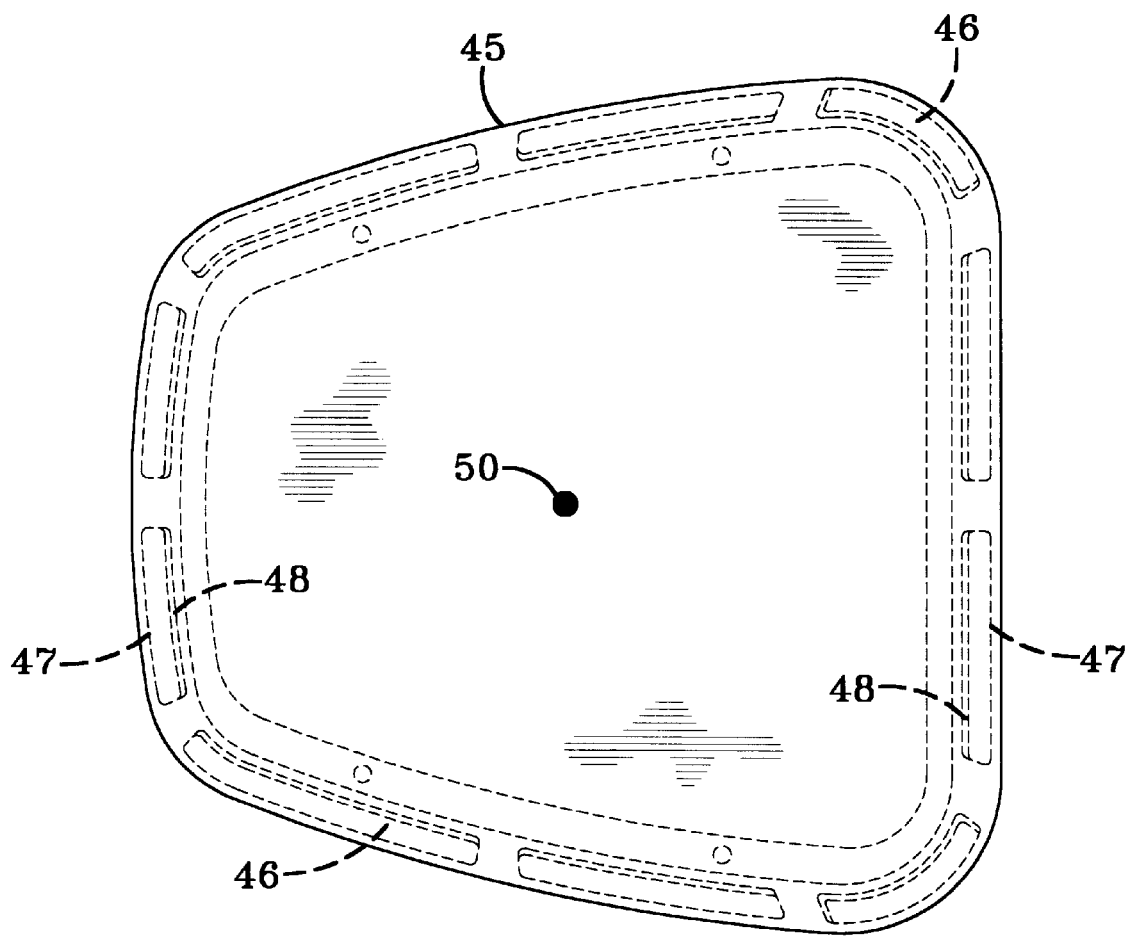

With reference to FIGS. 4, 6 and 9, there are provided two design features which help prevent rain or other unwanted substances from entering the air grill 40 and thus the engine (the engine 20 is shown in FIG. 2). The two design features, which will be explained, are the angling of the inlet openings 46 and the covering or shielding of the inlet openings 46 by the cap 42. The angling of the inlet openings 46 can be seen by noting that each inlet opening 46 has a top 47 and a bottom 48. The bottoms 48, as best seen in FIG. 9, are positioned inwardly of the tops 47. By inwardly it is meant that the inlet openings 46 are angled such that the bottoms 48 are closer than the tops 47 to a center point 50 located in the middle of the air grill 40. The fact that the cap 42 covers or shields the inlet openings 46 can be seen by noting that the cap 42 has an outer edge 45 in FIG. 9 which is positioned outwardly of the inlet openings 46. By outwardly it is meant that the outer edge 45 of the cap 42 is farther than the inlet openings 46 from a center point 50 located in the middle of the air grill 40.

With reference now to FIGS. 4–5 and 7–8, the air grill 40 also has a lip 41. The lip 41 has holes 39 which are used to connect the air grill 40 to the hood 32 or other engine covering apparatus. In this preferred embodiment screws 38 are used in holes 39 but other connecting means known in the art could also be used.

Figure 7:
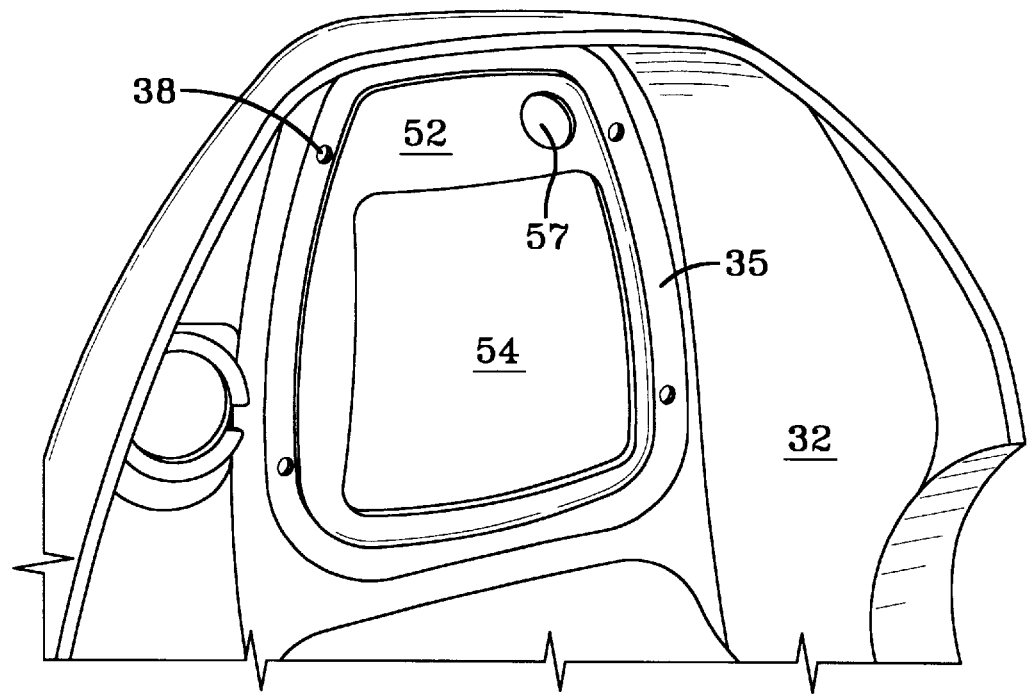
FIG. 7 is a perspective bottom view of the opened hood showing the first and second discharge openings of the air grill.
Figure 8:
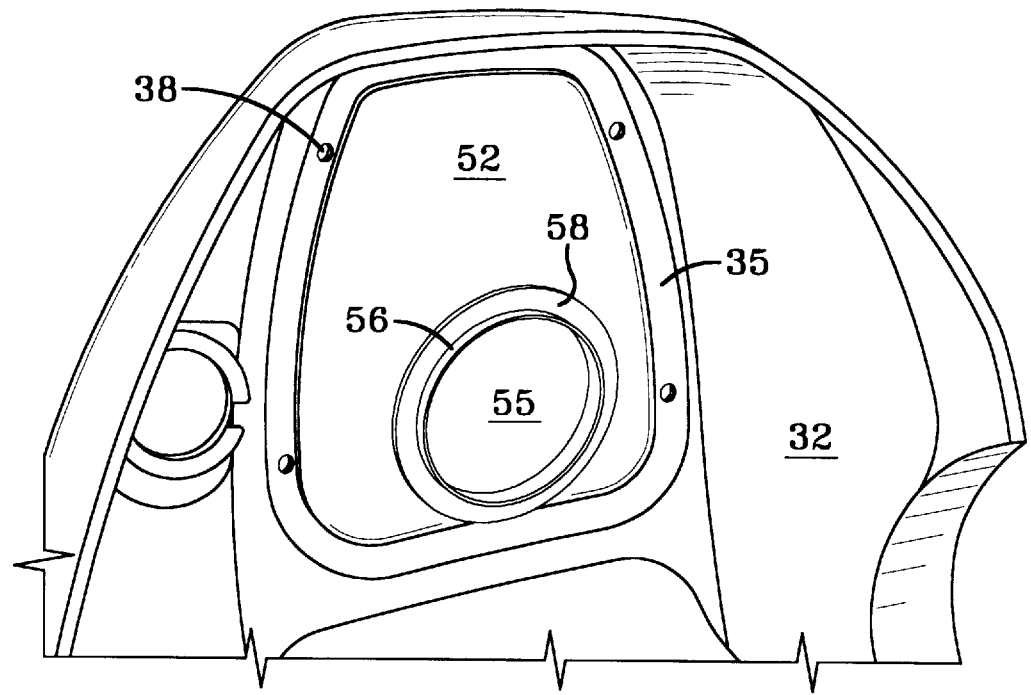
FIG. 8 is a perspective bottom view of the opened hood showing an air grill with a circular discharge opening; and, FIG. 9 is a top view of the air grill showing the inlet openings in dashed lines.

With reference now to FIGS. 5–8, the air grill 40 may have a bottom 52. It should be noted that a bottom is not required but is preferred in order to more effectively direct air that enters the air grill 40 to the engine (the engine 20 is shown in FIG. 2). Accordingly, the bottom 52 has a first discharge opening, described below, for discharging air from the air grill 40. This first discharge opening would be shaped with sound engineering judgement to best suit the engine being supplied with air. If the engine, or radiator located before it, had a rectangular shape as does radiator 22 shown in FIG. 2, the first discharge opening 54 would be shaped similarly as shown in FIG. 7. If on the other hand, the engine or its radiator had a circular shape, the first discharge opening 55 would likewise have a circular shape as shown in FIGS. 5–6 and 8. A circular shape is preferred in that the air losses are less with this configuration. The discharge opening 55 may be equipped, as shown in FIGS. 5–6 and 8, with a rim 56. The rim 56 enables the discharge opening 55 to form a seal with the associated engine. It is preferred then, with reference to FIG. 8, to also use a sealing member 58 positioned adjacent to the rim 56. In the preferred embodiment, the sealing member 58 is an elastomeric band.

With reference to FIGS. 2 and 7–8, it should be noted that the air grill 40, with or without a bottom 52, having a first discharge opening 54 or 55 could be used to supply air for cooling and air for combustion to the engine 20. It is preferred, however, to provide a second discharge opening 57 in these cases. Thus, first discharge opening 54 supplies cooling air to radiator 22 and second discharge opening 57 supplies combustion air to the inlet opening 26 of the combustion air cleaner 24.

The preferred embodiments have been described, hereinabove. It will be apparent to those skilled in the art that the above methods may incorporate changes and modifications without departing from the general scope of this invention. It is intended to include all such modifications and alterations insofar as they come within the scope of the appended claims or the equivalents thereof.

Having thus described the invention, it is now claimed:

1. An air grill for use in cooling an associated engine, the associated engine, having an engine hood with an opening, said air grill comprising:
    a cap having a front and a back;
    a bottom including a rim defining a first discharge opening for discharging air out of said grill, said rim adapted to extend through said opening in said engine hood;
    a middle portion connecting said cap to said bottom, said middle portion having a plurality of inlet openings for admitting air within said air grill; and,
    connecting means for connecting said air grill to said engine hood.

2. The air grill of claim 1 wherein said cap is contoured including said front of said cap having a height H1 and a width W1 and said back of said cap having a height H2 and a width W2, the ratio of H1/H2 being between 1.2 and 3.0, the ratio of W1/W2 being between 1.2 and 10.0.

3. The air grill of claim 1 wherein said middle portion comprises:
    four sides, at least one of said plurality of openings being positioned on each of said four sides.

4. The air grill of claim 3 wherein said first discharge opening has a substantially circular cross-section.

5. The air grill of claim 1 further comprising:
    a sealing member for forming a seal with the associated engine, said sealing member positioned on said bottom adjacent to said rim.

6. The air grill of claim 1 wherein said air grill supplies air for cooling the associated engine.

7. The air grill of claim 6 wherein said bottom has a second discharge opening for discharging air for combustion to the associated engine.

8. The air grill of claim 1 wherein said connecting means comprises:
    a lip positioned between said plurality of inlet openings and said first discharge opening and having a plurality of holes.

9. The air grill of claim 1 wherein said plurality of inlet openings have tops and bottoms and said bottoms are positioned inwardly of said tops.

10. The air grill of claim 9 wherein said cap has an outer edge, said outer edge being positioned outwardly of said tops of said plurality of inlet openings.

11. A riding lawn mower comprising:
    a frame having a mid-section and a back;

a plurality of wheels operatively connected to said frame;

an operator seat operatively connected to said frame;

a cutting deck operatively connected to said mid-section of said frame;

an engine operatively connected to said back of said frame behind said operator seat;

a hood pivotably connected to said frame for use in covering said engine, said hood having a top with an opening;

an air grill that is positioned directly over said opening in said hood and said engine, the air grill including,
  a) a contoured cap having a front, a back, and an outer edge, said front having a height H1 and a width W1 and said back having a height H2 and a width W2, the ratio of H1/H2 being between 1.2 and 3.0, the ratio of W1/W2 being between 1.2 and 10.0;
  b) a bottom including a rim defining a first discharge opening for discharging air out of said grill for use in cooling said engine, said rim extending through said opening in said hood, said bottom also having a second discharge opening for use in discharging air for combustion to said engine;
  c) a middle portion connecting said cap to said bottom, said middle portion having four sides and a plurality of inlet openings, a least one of said plurality of inlet openings being positioned on each of said four sides, said plurality of inlet openings having tops and bottoms with said bottoms being positioned inwardly of said tops, said outer edge of said cap being positioned outwardly of said tops of said plurality of inlet openings; and,
  d) connecting means for connecting said air grill to said hood, said connecting means including a lip positioned between said plurality of openings and said first discharge opening and having a plurality of holes.

* * * * *